(12) United States Patent
Jeong

(10) Patent No.: US 8,619,026 B2
(45) Date of Patent: Dec. 31, 2013

(54) METHOD AND APPARATUS FOR CONTROLLING MOVEMENT OF CURSOR

(76) Inventor: Yong-Seok Jeong, Seoul (KR)

(*) Notice: Subject to any disclaimer, the term of this patent is extended or adjusted under 35 U.S.C. 154(b) by 214 days.

(21) Appl. No.: 12/977,684

(22) Filed: Dec. 23, 2010

(65) Prior Publication Data

US 2011/0148761 A1    Jun. 23, 2011

Related U.S. Application Data

(63) Continuation of application No. PCT/KR2009/003459, filed on Jun. 26, 2009.

(30) Foreign Application Priority Data

Jun. 26, 2008    (KR) .................. 10-2008-0060616

(51) Int. Cl.
*G06F 3/033*    (2013.01)
*G09G 5/00*    (2006.01)

(52) U.S. Cl.
USPC ........................................ 345/157; 345/1.1

(58) Field of Classification Search
USPC ........................ 345/157, 1.1; 715/856, 858
See application file for complete search history.

(56) References Cited

U.S. PATENT DOCUMENTS

| | | |
|---|---|---|
| 5,635,954 A | 6/1997 | Yamada |
| 5,917,486 A | 6/1999 | Rylander |
| 6,137,472 A | 10/2000 | Pekelney |
| 6,339,440 B1 | 1/2002 | Becker et al. |
| 6,683,627 B1 * | 1/2004 | Ullmann et al. ............... 715/786 |
| 7,978,172 B2 * | 7/2011 | Fujita ............................. 345/156 |

FOREIGN PATENT DOCUMENTS

| | | |
|---|---|---|
| JP | 08234913 | 9/1996 |
| JP | 1996234913 | 9/1996 |

OTHER PUBLICATIONS

Chinese office action with English language summary dated Sep. 27, 2012, received in corresponding Chinese Patent Application No. 200980132536.
International Search Report and Written Opinion dated Feb. 8, 2010 issued in related International Patent Application No. PCT/KR2009/003459, 7 pages. (English language abstract of Preliminary Report on Patentability enclosed, 1 page).

* cited by examiner

*Primary Examiner* — Kevin M Nguyen
(74) *Attorney, Agent, or Firm* — Grossman Tucker Perreault & Pfleger, PLLC

(57) ABSTRACT

A method and a device for controlling cursor movement is disclosed. The cursor movement control device comprises an input unit that accepts the cursor movement commands from the user, a first display unit that displays a screen including said cursor, a graphical user interface unit that determines the selected region on said screen and a cursor movement control unit that calculates said cursor movement in said selected region. In this way, the present invention provides a method and a device for controlling cursor movement requiring only minor action from the user.

20 Claims, 9 Drawing Sheets

METHOD AND APPARATUS FOR CONTROLLING MOVEMENT OF CURSOR

CROSS-REFERENCE TO RELATED APPLICATION

The present application is a continuation of prior PCT Application No. PCT/KR2009/003459 filed on Jun. 26, 2009, which is fully incorporated herein by reference.

TECHNICAL FIELD

The present invention is related to an interface, more specifically to a method and an apparatus for controlling the movement of a cursor.

BACKGROUND ART

Today's mobile phones, PDA, PC, IPTV (Internet Protocol Television), etc. offer a variety of graphical user interfaces. In the case of PC, particularly, a great number of operations are performed by manipulating a cursor through an input by use of a mouse.

With the improved functionalities of mobile phones, PDA and IPTV, it has become possible to provide the PC level of interface with the mobile phones, PDA and IPTV.

The graphical user interface for IPTV is often operated by use of a remote control. However, the button input of the remote control is more inconvenient in moving the cursor than the mouse. In order to move a cursor that is located on one side of a display to the opposite side, the user has to experience the inconvenience of holding down a button on the remote control. While it is possible to move the cursor quickly to a target with the mouse, the remote control requires the user to wait until the cursor arrives at the target since the remote control can move the cursor at a predetermined speed only. Although it would take a shorter time if the moving speed of the cursor were made faster, it would impose another problem that minute cursor movements at the target are not possible.

As display devices support higher resolutions, the distance that the cursor travels in the PC has increased by far. As a result, the user is required to operate the mouse in a greater range of movement. Although it can be configured that the traveling distance of the mouse is proportionally increased with the moving speed of the mouse, this causes a problem that the accuracy of cursor operation using the mouse becomes deteriorated.

Technical Problem

The present invention provides a method and an apparatus for controlling the movement of a cursor by use of a selection area.

Other problems that the present invention solves will become apparent through the description below.

Technical Solution

An aspect of the present invention features an apparatus for controlling the movement of a cursor that includes: an input unit configured to receive a command to move a cursor from a user; a first display unit configured to display a screen including the cursor and a graphical user interface; a graphical user interface unit configured to set a selection area in the screen; and a cursor movement controlling unit configured to make a computation for the movement of the cursor in the selection area.

Another aspect of the present invention features a method of controlling the movement of a cursor in a software platform that can set selection areas in a screen and provide selection area information for setting the selection areas. The method includes: (a) receiving the selection area information from the software platform; (b) assessing a cursor area through the selection area information and determining whether the cursor escapes the cursor area; (c) selecting a movement area from one of the selection areas according to the determination of the movement area determining unit; and (d) compensating the position of the cursor to the movement area. The cursor area is a selection area in which the cursor is positioned, and the movement area is a selection area to which the cursor is to move.

Advantageous Effects

The present invention provides a method and an apparatus for controlling the movement of a cursor.

The present invention provides a method and an apparatus that can control the movement of a cursor with a small movement of a user.

MODE FOR INVENTION

Figure 1:
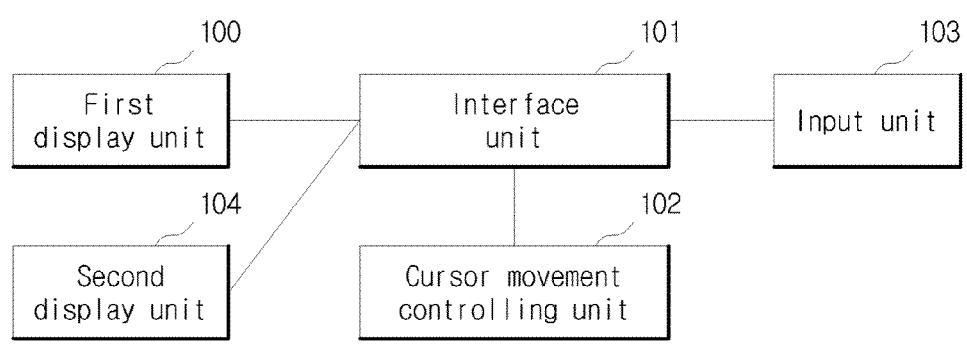
FIG. 1 illustrates an apparatus for controlling the movement of a cursor in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Moreover, while some embodiments will be described in detail with reference to the accompanying drawings, identical elements will be given the same reference numerals, regardless of the figure number, and any redundant description of the identical or corresponding elements will not be repeated. Throughout the description of the present invention, when describing a certain known technology is determined to evade the point of the present invention, the pertinent detailed description will be omitted.

The "cursor" to be described hereinafter refers to a graphical user interface such as a mouse pointer of a PC that can point and operate a graphical user interface object displayed on a screen.

FIG. 1 illustrates an apparatus for controlling the movement of a cursor in accordance with an embodiment of the present invention.

Referring to FIG. 1, the apparatus for controlling the movement of a cursor includes a first display unit 100, a graphical user interface unit 101, a cursor movement controlling unit 102, an input unit 103 and a second display unit 104.

The first display unit 100 is a functional unit that displays a screen for providing visual information to a user.

The graphical user interface unit 101 generates and updates a graphical user interface of the apparatus for controlling the movement of a cursor. For example, the graphical user interface unit 101 causes the cursor to be displayed on the screen of the first display unit 100 and receives a cursor position from the cursor movement controlling unit 102 to update the position and display the cursor. Moreover, the graphical user interface unit 101 sets a selection area, which is an area where the cursor can be positioned. For example, the graphical user interface unit 101 can set a control (e.g. a button control) in a graphical user interface that can receive an input of the cursor as the selection area. Moreover, by providing a module (e.g. API—Application Programming Interface) that can set the selection area based on the coordinates of an application, a location configured by an application developer among locations where an application that can be operated in the apparatus for controlling the movement of a cursor is displayed can be set as the selection area. The graphical user interface unit 101 can set center point coordinates of a selection area for a control that can receive the input of each cursor as a default. The graphical user interface unit 101 can also provide a module (e.g. API) that can separately set the center point coordinates for the selection area. The selection area in accordance with the present embodiment will be described later with reference to FIG. 3.

The cursor movement controlling unit 102 makes a computation for the movement of a cursor in the selection area. For example, the cursor movement controlling unit 102 compensates the coordinates for the movement of the cursor in the selection area that is configured by the graphical user interface unit 101. The cursor movement controlling unit 102 will be described later with reference to FIG. 2.

The input unit 103 is a means for receiving a command of the user's cursor movement. The input unit 103 can be a mouse, a remote control or a touch pad. For example, the input unit 103 can generate operation information based on the user's mouse operation and transmit the operation information to the graphical user interface unit 101.

The second display unit 104 is a functional unit that displays a separate screen from the first display unit 100. It shall be apparent that the second display unit 104 can be a partial screen of the first display unit 100.

Moreover, in case the input unit 103 is implemented as a separate device, such as a mobile phone or a remote control, from the apparatus for the movement of a cursor, the second display unit 104 can be included in the separate device as a screen or a touch screen of the remote control or the mobile phone.

Figure 2:
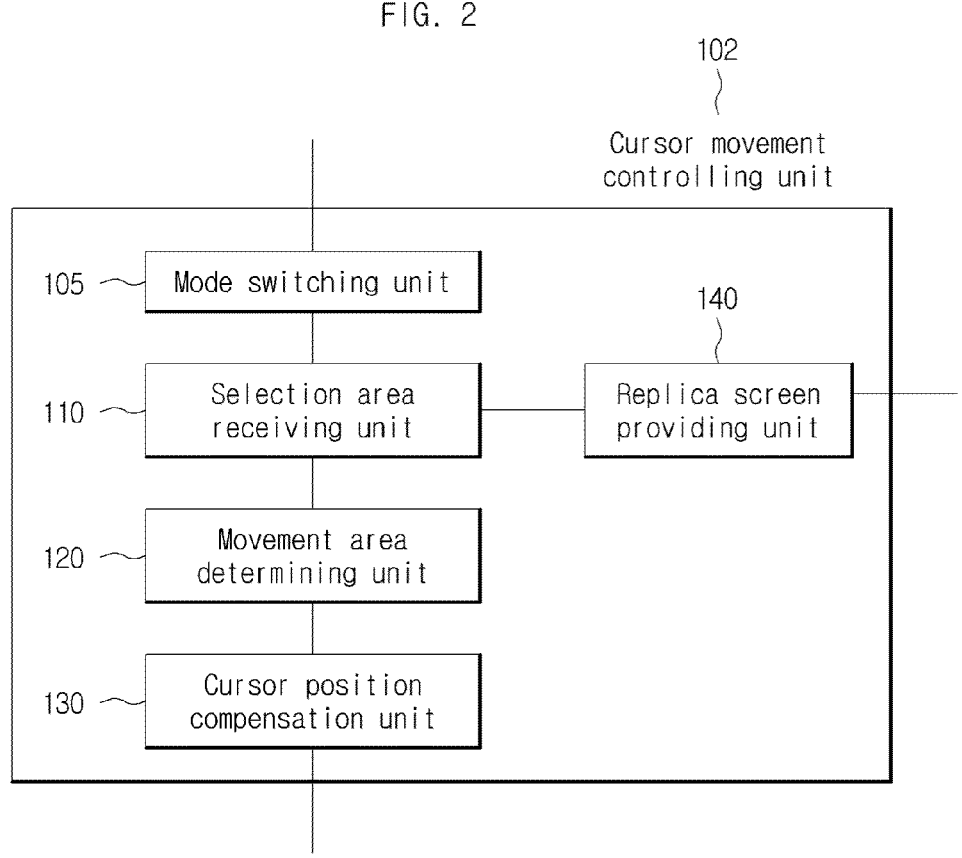
FIG. 2 illustrates a cursor movement controlling unit in accordance with an embodiment of the present invention.

FIG. 2 illustrates a cursor movement controlling unit in accordance with an embodiment of the present invention.

Referring to FIG. 2, the cursor movement controlling unit 102 includes a mode switching unit 105, a selection area receiving unit 110, a movement area determining unit 120, a cursor position compensation unit 130 and a replica screen providing unit 140.

The mode switching unit 105 switches a mode when an input signal for a particular shortcut key is received from the graphical user interface unit 101. The mode can be a general mode or a control mode. In the general mode, the cursor movement is controlled regardless of the selection area, just like a general cursor movement. In the control mode, the cursor position is moved and controlled in the selection area only. As the mode switching unit 105 switches to the control mode after receiving the input signal for a particular shortcut key from the graphical user interface unit 101, the mode switching unit 105 sends a control mode request signal to the selection area receiving unit 110. The control mode request signal is a signal requesting that functions of the selection area receiving unit 110 and the movement area determining unit 120 are carried out. In other words, in the general mode, the selection area receiving unit 110 and the movement area determining unit 120 may not carry out their functions.

Once a mode switching signal is received from the mode switching unit 105 and the mode is switched to the control mode, the selection area receiving unit 110 receives selection area configuration information from the graphical user interface unit 101. That is, the selection area receiving unit 110 can receive selection area information from the graphical user interface unit 101, the selection area information including the range and center coordinates of a region configured as the selection area in a screen to be outputted on the display device. The movement area determining unit 120 is inputted with the selection area configuration information from the selection area receiving unit 110. In addition, the movement area determining unit 120 is inputted with the coordinates of a current cursor from the graphical user interface unit 101. Subsequently, the movement area determining unit 210 makes reference to the selection area configuration information to determine whether the cursor is located in the selection area. The movement area determining unit 120 periodically determines whether the cursor is located in the selection area, and sends a movement area request signal to the cursor position compensation unit 130 when the cursor is moving out of the selection area. The movement area request signal includes the coordinates and selection area configuration information of the current cursor.

The cursor position compensation unit 130 compensates the position of the cursor according to the movement area request signal. For example, the cursor position compensation unit 130 compensates the coordinates of the cursor in the movement area request signal and sends the compensated coordinates to the graphical user interface unit 101 such that the cursor moves to a nearest selection area among selection areas located on a line extended from a perpendicular line to a border line of a nearby selection area that passes through the coordinates of the current cursor.

Moreover, in case the cursor is positioned outside the selection area when the mode is changing from the general mode to the control mode after the selection area receiving unit 110 receives the mode switching signal from the mode switching unit 105, the cursor can be controlled to a nearest center among the centers of the selection areas.

The replica screen providing unit 140 extracts the selection area only in a displayed screen, and provides a screen in which the extracted selection area is combined ("replica screen" hereinafter). The replica screen is sent to the second display unit 104 through the graphical user interface unit 101.

The steps of compensating the cursor position will be described later in detail with reference to FIG. 5.

Figure 3:
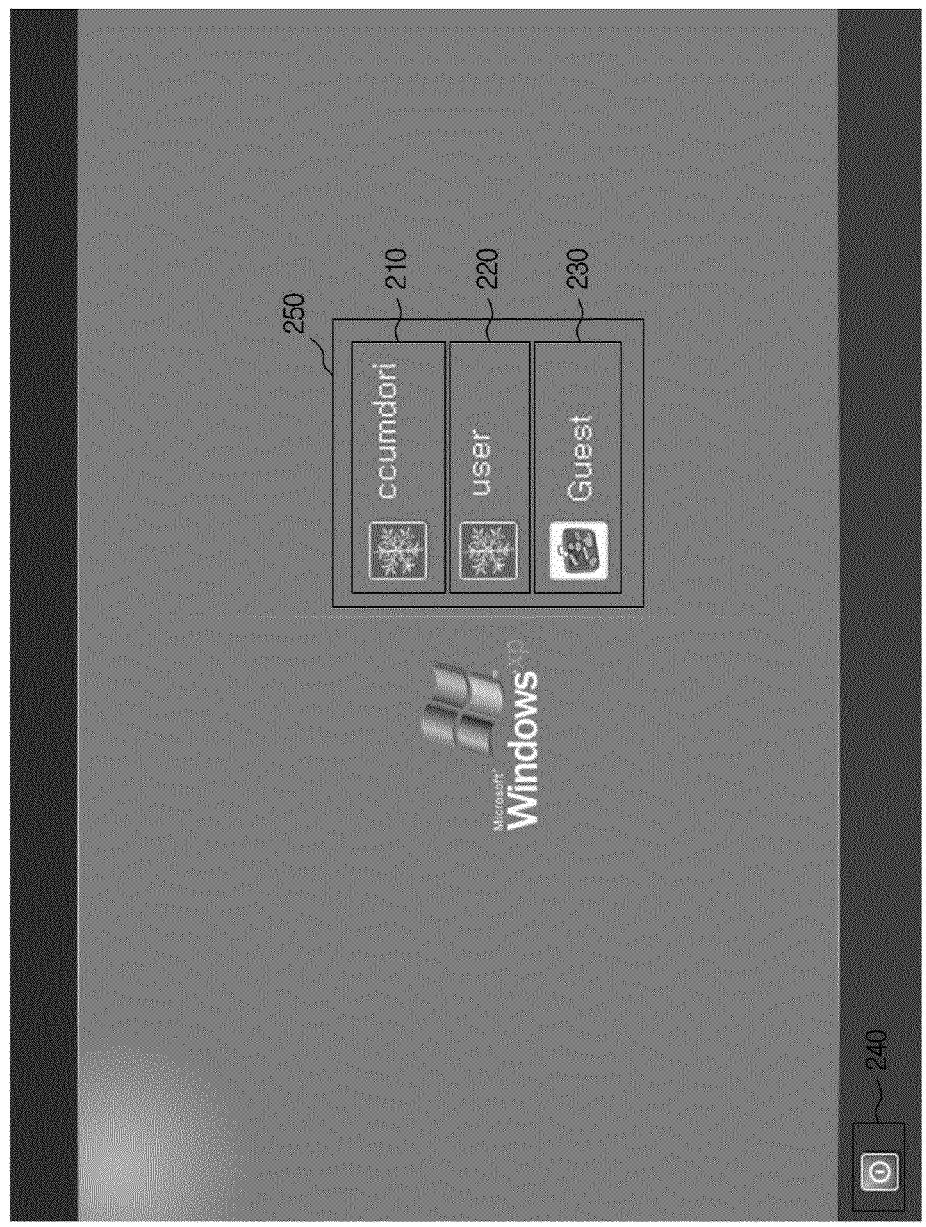
FIG. 3 illustrates selection areas in accordance with an embodiment of the present invention.
Figure 4:
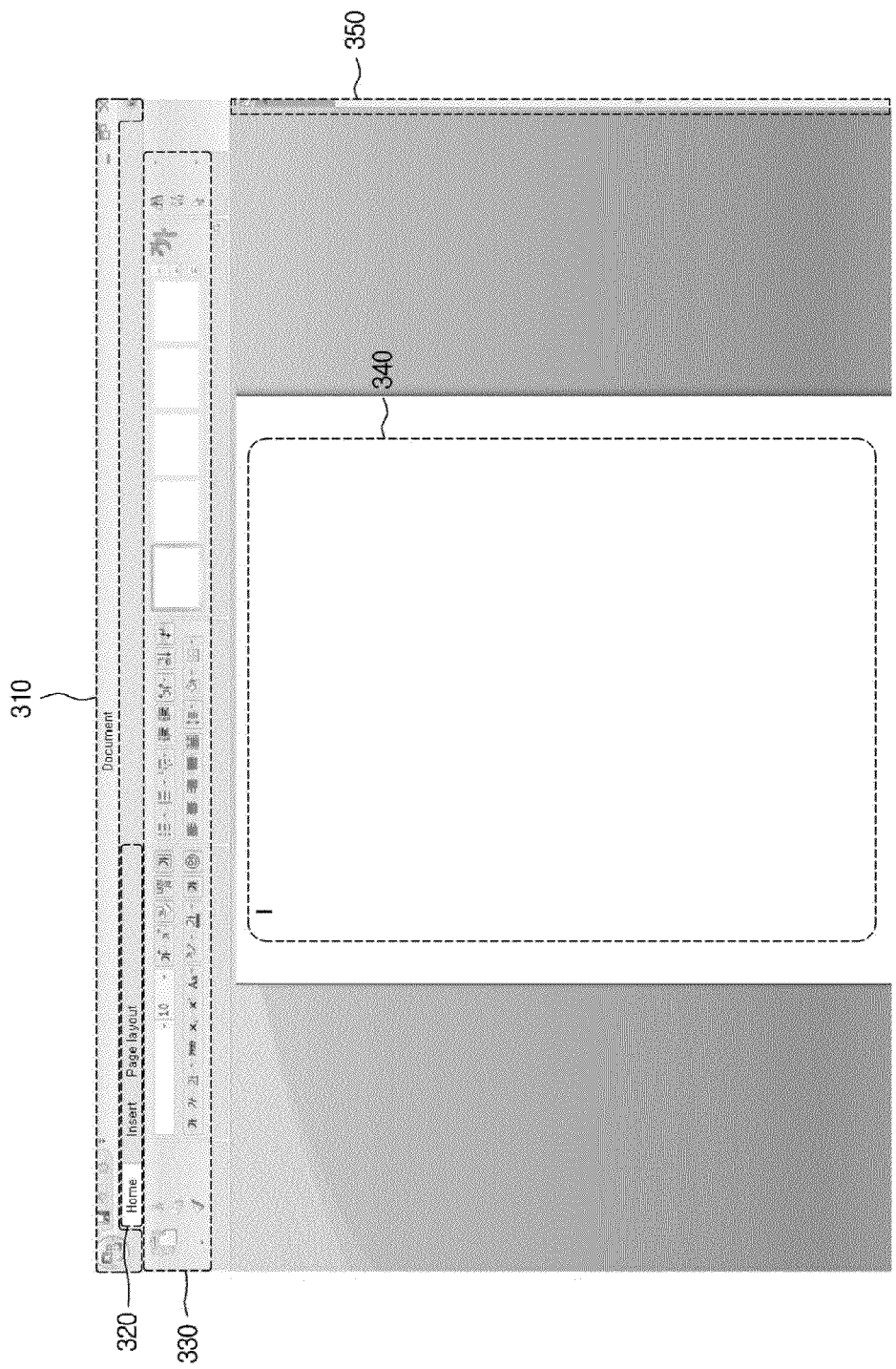
FIG. 4 illustrates selection areas in accordance with another embodiment of the present invention.

FIG. 3 illustrates selection areas in accordance with an embodiment of the present invention, and FIG. 4 illustrates selection areas in accordance with another embodiment of the present invention.

Referring to FIG. 3 and FIG. 4, a log-off screen of an operating system installed in a PC is illustrated in FIG. 3. An input is actually made using the cursor in areas 210 and 220. Therefore, the selection areas can be set as areas 210 and 220, to which input can be made using the cursor.

In case the selection areas are successively arranged with a specific distance or closer in between, like areas 210 and 230, a plurality of selection areas can be recognized as one selection area, as shown in selection area 250. For example, if there are consecutive selection areas and each of the selection areas has its width and height that are smaller than a predetermined size, the consecutive selection areas can be combined until the combined widths and heights become the predetermined size or greater and recognized as one selection area. In other words, the selection area receiving unit 110 can recognize the selection areas that are smaller than the predetermined size as a selection combined with adjacent selection areas.

In FIG. 4, an application is indicated as a selection area in an active window. Input can be made using the cursor in areas 310 to 350, which can be set as selection areas. In the case of an application, a separate graphical user interface, such as 340, can be provided in the application and can be inputted using the cursor, in addition to a graphical user interface provided by the operating system. The operating system can provide a module that can set a selection area and allow a developer to set and develop the selection area within the application.

Figure 5:
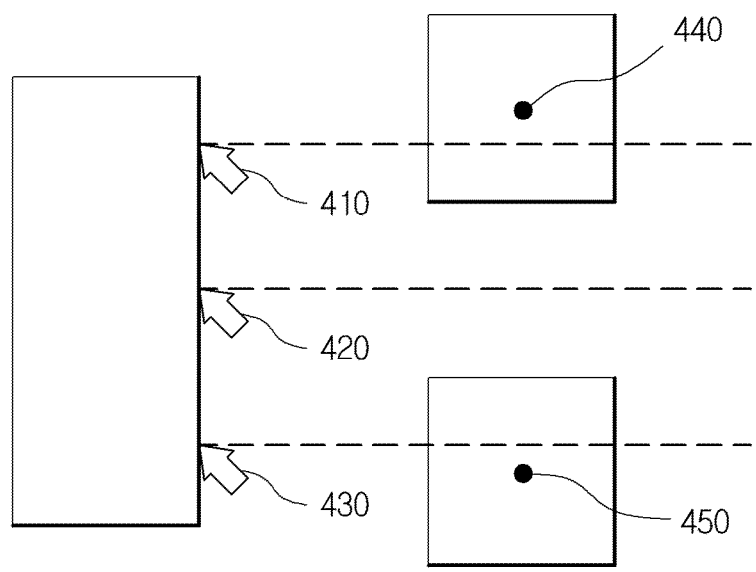
FIG. 5 illustrates how a selection area to which the cursor is to be moved is selected in accordance with an embodiment of the present invention.

FIG. 5 illustrates how a selection area to which the cursor is to be moved is selected in accordance with an embodiment of the present invention.

In the description hereinafter, the cursor will be located at three different positions 410, 420, 430. The three positions 410, 420, 430 are located at border lines of selection areas ("cursor area" hereinafter) at which the current cursor is located. In case the cursor moves from position 410 and away from the border line, the movement area determining unit 120 determines that the position of the cursor is out of the selection area, generates a movement area request signal, and sends the movement area request signal to the cursor position compensation unit 130.

The cursor position compensation unit 130 computes a virtual line that is perpendicular to the border line of the selection area in which the cursor at position 410 was located, and selects a nearest selection area among selection areas, through which this line passes, as a selection area ("movement area" hereinafter) to which the cursor will be moved.

Then, the cursor position compensation unit 130 compensates the position of the cursor to the center point 440 of the selected selection area, sends the coordinates of the compensated cursor to a platform, and controls the platform to ultimately move the cursor.

In case the cursor moves from position 420 and away from the border line, the cursor position compensation unit 130 computes a virtual line that is perpendicular to the border line of the selection area of position 420, like the case of position 410, and selects a nearest selection area among selection areas through which this line passes as a movement area to which the cursor will be moved. In the case of position 420, since there is no selection area on this line, the position of the cursor is not compensated from the current selection area to another selection area but compensated to keep the cursor from moving away from the current selection area. That is, if the cursor is moved from the coordinates (x, y) of position 420 to (x+1, y+1) coordinates by input of an input device (e.g. mouse, touch pad, etc.), the input for moving in the x-axis direction is excluded, and the position of the cursor is compensated to (x, y+1) coordinates.

If the cursor moves from position 430 and away from the border line, the cursor position compensation unit 130 carries out the same steps as position 410, and the coordinates of the cursor are compensated to position 450, and the compensated coordinates are sent to the platform.

Figure 6:
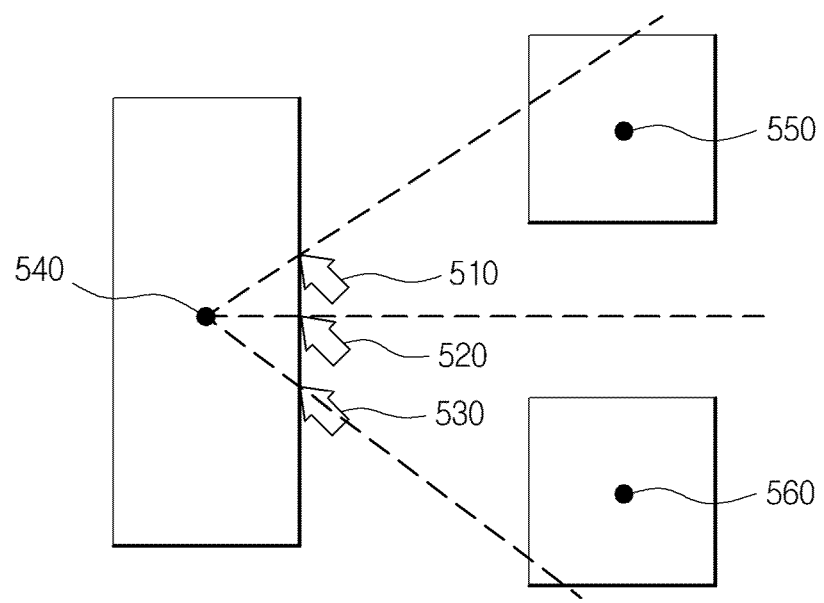
FIG. 6 illustrates how a selection area to which the cursor is to be moved is selected in accordance with another embodiment of the present invention.

FIG. 6 illustrates how a selection area to which the cursor is to be moved is selected in accordance with another embodiment of the present invention.

In the description hereinafter, the cursor will be located at three different positions 510, 520, 530. The three positions 510, 520, 530 are located at border lines at which the current cursor is located. Each of the selection areas in FIG. 6 includes a center point 540, 550, 560. Referring to FIG. 6, In case the cursor moves from position 410 and away from the border line, the movement area determining unit 120 determines that the position of the cursor is out of the selection area, generates a movement area request signal, and sends the movement area request signal to the cursor position compensation unit 130.

The cursor position compensation unit 130 computes a virtual line that passes position 510 from center point 540 of the selection area at which the cursor was located, and selects a nearest selection area among selection areas, through which the computed line passes, as the movement area to which the cursor will be moved. Therefore, the cursor position compensation unit 130 selects the selection area including center point 550 that is located on this line as the movement area.

The cursor position compensation unit 130 compensates the coordinates of the cursor to the coordinates of center point 550 of the selection area to be moved to, and sends the compensated coordinates of the cursor to the platform.

In case the cursor moves from position 520 and away from the border line, the cursor position compensation unit 130 computes a virtual line that passes position 520 from center position 540 of the selection area in which the cursor at position 520 was positioned, like the case of position 510, and selects a nearest selection area among selection areas that are located on the computed line as the movement area to which the cursor will be moved. In the case of position 520, since there is no selection area on this line, the position of the cursor is not compensated from the current selection area to another selection area but compensated to keep the cursor from moving away from the current selection area. That is, if the cursor is moved from the coordinates (x, y) of position 520 to (x+1, y+1) coordinates by input of an input device (e.g. mouse, touch pad, etc.), the input for moving in the x-axis direction is excluded, and the position of the cursor is compensated to (x, y+1) coordinates.

If the cursor moves from position 530 and away from the border line, the cursor position compensation unit 130 carries out the same steps as position 510, and the coordinates of the cursor are compensated to position 560, and the compensated coordinates are sent to the platform.

Although it has been described with reference to FIGS. 5 and 6 that the movement area is moved according to the position of the current cursor, it is possible to select the movement area, to which the cursor is moved, according to a weighted value configured for each of the selection areas. Here, it is possible that the selection area information includes the weighted value corresponding to each of the selection areas. The weighted value can be set as a default value in the operating system or set by the developer through API. For example, the cursor position compensation unit 130 that received a movement area request signal from the movement area determining unit 120 analyzes the weighted value assigned to each of the selection areas. The cursor position compensation unit 130 selects a movement area that has the greatest weighted value in the analyzed weighted value among the selection areas having the weighted value that is less than or equal to the weighted value of the cursor area. In case there are selection areas having the same weighted value that is less than or equal to that of the selection area, one of the selection areas having the same weighted value is selected through the steps described with reference to FIGS. 5 and 6.

Moreover, it is possible that the movement area determining unit 120 selects the movement area, to which the cursor is moved, in a reverse order of the weighted value. Here, the movement area determining unit 120 can move the cursor in the forward order or reverse order of the weighted value based on the border through which the cursor moves away from the selection area.

Figure 7:
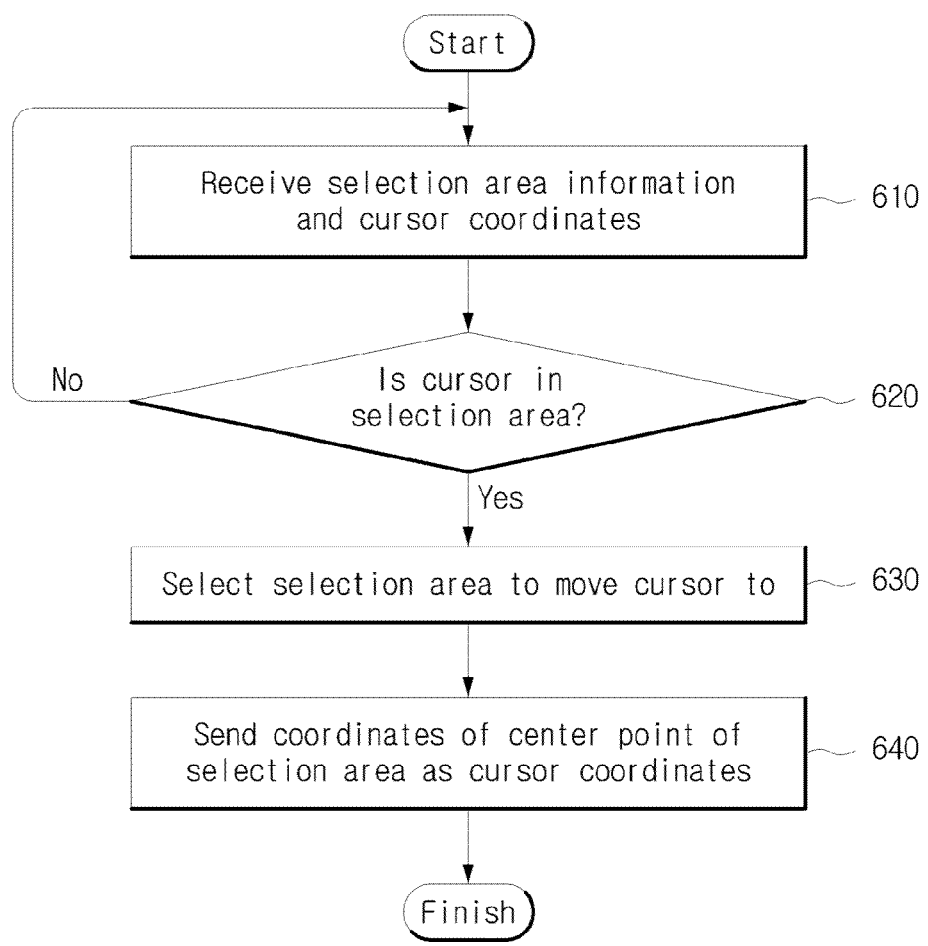
FIG. 7 is a flow diagram showing the steps of controlling the movement of a cursor in accordance with an embodiment of the present invention.

FIG. 7 is a flow diagram showing the steps of controlling the movement of a cursor in accordance with an embodiment of the present invention. Although the steps illustrated in FIG. 7 are carried out by each functional unit of the cursor movement controlling unit 102, it will be described here that the steps are carried out by an apparatus for controlling the movement of a cursor in order to describe the invention more clearly.

Referring to FIG. 7, the cursor movement controlling unit 102 receives selection area information and cursor coordinates (610).

The cursor movement controlling unit 102 determines whether the cursor is positioned in a selection area (620).

If the cursor is positioned in the selection area, the cursor movement controlling unit 102 repeats step 610.

If the cursor is not positioned in the selection area, the cursor movement controlling unit 102 selects a movement area to which the cursor will be moved (630). The steps for selecting the movement area have been described with reference to FIGS. 5 and 6 and thus will be omitted.

Then, the cursor movement controlling unit 102 sends compensated coordinates of the cursor to the graphical user interface unit 101 so that the coordinates of a center point of the movement area are compensated as the coordinates of the cursor.

Figure 8:
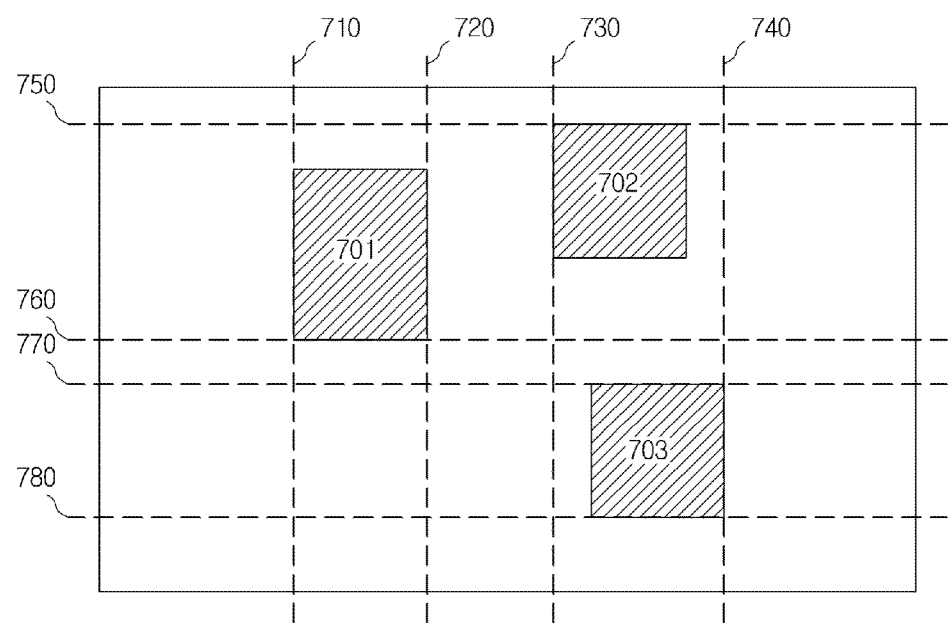
FIG. 8 illustrates an original screen in order to describe how a replica screen is generated in accordance with an embodiment of the present invention.
Figure 9:
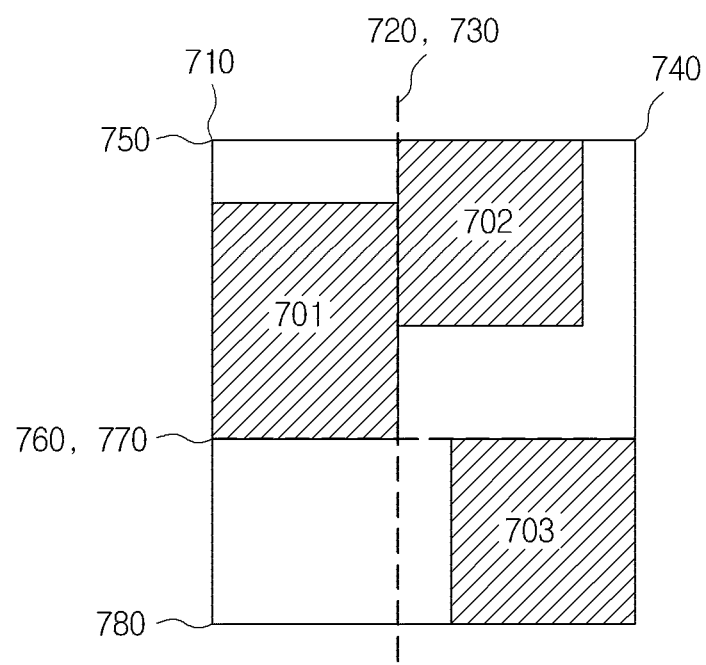
FIG. 9 illustrates a replica screen converted from the original screen of FIG. 8 in accordance with an embodiment of the present invention.

FIG. 8 illustrates an original screen in order to describe how a replica screen is generated in accordance with an embodiment of the present invention, and FIG. 9 illustrates a replica screen converted from the original screen of FIG. 8 in accordance with an embodiment of the present invention.

Here, guide lines 710 to 780 are lines that pass pixels adjacent to an outside of a selection area.

Illustrated in FIG. 8 are three selection areas. Hereinafter, each of the three selection areas will be referred to as a first selection area 701, a second selection area 702 and a third selection area 703, respectively. The replica screen providing unit 140 generates a replica screen by combining one or more selection areas. The replica screen providing unit 140 removes columns and rows of pixels that do not pass the selection areas in the original screen, and adjusts the size of the screen to fit a specific resolution.

For example, the replica screen providing unit 140 removes the columns that the selection areas are not positioned. That is, all pixels between the left-most column and the column positioned on line 710 are removed. Then, the replica screen providing unit removes pixels between the column positioned on line 720 and the column positioned on line 730, and removes pixels between the column positioned on line 740 and the right-most column.

Afterwards, the replica screen providing unit 140 removes all pixels between the upper-most row and the row positioned on line 750. The replica screen providing unit 140 removes all pixels between the row positioned on line 760 and the row positioned on line 770. Then, the replica screen providing unit 140 removes all pixels between the row positioned on line 780 and the lower-most row.

Once the replica screen providing unit 140 removes the rows and columns of pixels that do not pass the selection areas in the screen of FIG. 8, the selection areas can be arranged as shown in FIG. 9.

The replica screen providing unit 140 can adjust the size of the screen in which the selection areas area arranged as shown in FIG. 9 so that the replica screen have a predetermined resolution. For example, the replica screen providing unit 140 can reduce or enlarge the screen in which the selection areas are combined so that the resolution of the combined screen and the predetermined resolution of the replica screen are identical.

The cursor position compensation unit 130 in accordance with an embodiment of the present invention can compensate the position of the cursor by configuring a logical pixel (i.e., a unit of movement of the pixel) according to the size of the selection area that is the smallest among the selection areas included in the original screen. For example, the logical pixel is configured in the same length as the shortest horizontal length (pixel) of the selection areas included in the original screen. Also, the vertical length of the logical pixel is computed through the same process as the horizontal length. For example, if the logical pixel is 2×3, the cursor position compensation unit 130 compensates the position of the cursor to move at a time by 2 pixels in the horizontal direction and by 3 pixels in the vertical direction. Since the pixel generally moves by one pixel each time, the speed of cursor movement can be changed according to the size of the selection area, by using the logical pixel.

Although the above logical pixel has been described to configure the shortest horizontal length and the shortest vertical length of a selection area among the selection areas included in the original screen as the horizontal length and the vertical length of the logical pixel, respectively, it shall be appreciated by those who are skilled in the art that it is possible to configure a value that is smaller than the shortest horizontal length of the selection area and a value that is smaller than the shortest vertical length of the selection area as the horizontal length and the vertical length of the logical pixel, respectively.

Furthermore, the graphical user interface unit 101 can cause the display of the center point and the border of each of the selection areas on the screen of at least one of the display unit 100 and the second display unit 104. Alternatively, the center point and the border of each of the selection areas may be displayed translucently, or not displayed.

Here, the first display unit 101 and the second display unit 104 can be independent from each other in displaying, translucently displaying or not displaying the center point and the border of the selection areas.

Hitherto, some embodiments of the present invention have been described. There can be a large number of embodiments, other than the described embodiments, in the claims of the present invention. It shall be understood by anyone of ordinary skill in the art to which the present invention pertains that there can be a number of permutations without departing the technical features of the present invention. Therefore, the described embodiments shall be understood in descriptive perspectives, not in restrictive perspectives. The scope of the present invention is defined by the appended claims, not in the above description, and all differences in the equivalent scope shall be understood to be included in the present invention.

What is claimed is:

1. An apparatus for controlling the movement of a cursor, comprising:
    an input unit configured to receive a command to move a cursor from a user;
    a first display unit configured to display a screen including the cursor and a graphical user interface;
    a graphical user interface unit configured to set selection areas in the screen, wherein a selection area is an area where the cursor can be positioned and includes a control in a user interface that can receive an input of the cursor or a predetermined area according to an application; and
    a cursor movement controlling unit configured to make a computation for the movement of the cursor in the selection area, wherein the cursor movement controlling unit comprises:
        a selection area receiving unit configured to receive selection area information from the graphical user interface unit;
        a movement area determining unit configured to assess a cursor area through the selection area information and to determine whether the cursor escapes the cursor area; and
        a cursor position compensation unit configured to select a movement area from one of the selection areas set in the selection area information according to the determination of the movement area determining unit and to compensate the position of the cursor to the movement area,
    wherein the cursor area is a selection area in which the cursor is positioned, and the movement area is a selection area to which the cursor is to move.

2. The apparatus of claim 1, further comprising:
    a replica screen providing unit configured to provide a replica screen in which the selection areas are combined; and
    a second display unit configured to display the replica screen.

3. The apparatus of claim 2, wherein:
    the replica screen providing unit removes pixels included in columns and rows that do not pass the selection areas in the screen; and
    the replica screen is generated by compensating a screen in which the pixels of columns and rows that do not pass the selection areas are removed to a predetermined resolution.

4. The apparatus of claim 1, further comprising a mode switching unit configured to switch to one of a general mode and a control mode based on an input signal of an assigned shortcut key from the graphical user interface unit, wherein the general mode is a mode in which the cursor moves regardless of the selection areas, and the control mode is a mode in which the cursor moves in the selection areas only.

5. The apparatus of claim 1, wherein:
    the cursor position compensating unit selects the movement area that is a nearest selection area to the cursor outside the cursor area among selection areas that meet with a line that starts from the position of the cursor and passes a border of the cursor area perpendicularly; and
    the line does not pass the cursor area.

6. The apparatus of claim 1, wherein the cursor position compensation unit selects the movement area that is a nearest selection area to the cursor outside the cursor area among selection areas that meet with a line that starts from a center point of the cursor area and passes the position of the cursor.

7. The apparatus of claim 6, wherein the graphical user interface unit is configured to set the center point as a default for each of the selection areas.

8. The apparatus of claim 1, wherein the cursor position compensation unit selects the movement area based on a weighted value of the cursor area.

9. The apparatus of claim 8, wherein the graphical user interface unit is configured to set the weighted value as a default for each of the selection areas.

10. The apparatus of claim 1, wherein the cursor position compensation unit compensates the position of the cursor by setting the shortest horizontal length and the shortest vertical length of the selection areas as a horizontal length and a vertical length of a logical pixel, respectively, whereas the logical pixel is a unit of movement of the cursor.

11. A method of controlling the movement of a cursor in a software platform that can set selection areas in a screen and provide selection area information for setting the selection areas, wherein a selection area is an area where the cursor can be positioned and includes a control in a user interface that can receive an input of the cursor or a predetermined area according to an application, the method comprising:
    (a) receiving the selection area information from the software platform;
    (b) assessing a cursor area through the selection area information and determining whether the cursor escapes the cursor area;
    (c) selecting a movement area from one of the selection areas according to a position of the cursor; and
    (d) compensating the position of the cursor to the movement area,
wherein the cursor area is a selection area in which the cursor is positioned, and the movement area is a selection area to which the cursor is to move.

12. The method of claim 11, further comprising providing a replica screen in which the selection areas are combined.

13. The method of claim 12, wherein the providing of the replica screen comprises:
    removing pixels included in columns and rows that do not pass the selection areas in the screen; and
    generating the replica screen by compensating a screen in which the pixels of columns and rows that do not pass the selection areas are removed to a predetermined resolution.

14. The method of claim 11, further comprising switching to one of a general mode and a control mode based on an input signal of an assigned shortcut key, wherein the general mode is a mode in which the cursor moves regardless of the selection areas, and the control mode is a mode in which the cursor moves in the selection areas only.

15. The method of claim 11, wherein:
the step (c) selects the movement area that is a nearest selection area to the cursor outside the cursor area among selection areas that meet with a line that starts from the position of the cursor and passes a border of the cursor area perpendicularly; and
the line does not pass the cursor area.

16. The method of claim 11, wherein the step (c) selects the movement area that is a nearest selection area to the cursor outside the cursor area among selection areas that meet with a line that starts from a center point of the cursor area and passes the position of the cursor.

17. The method of claim 16, further comprising setting the center point as a default for each of the selection areas by a graphical user interface unit.

18. The method of claim 11, wherein the step (c) selects the movement area based on a weighted value of the cursor area.

19. The method of claim 18, further comprising setting the weighted value as a default for each of the selection areas by the platform.

20. The method of claim 11, wherein the step (d) compensates the position of the cursor by setting the shortest horizontal length and the shortest vertical length of the selection areas as a horizontal length and a vertical length of a logical pixel, respectively, whereas the logical pixel is a movement unit of the cursor.

* * * * *